UNITED STATES PATENT OFFICE.

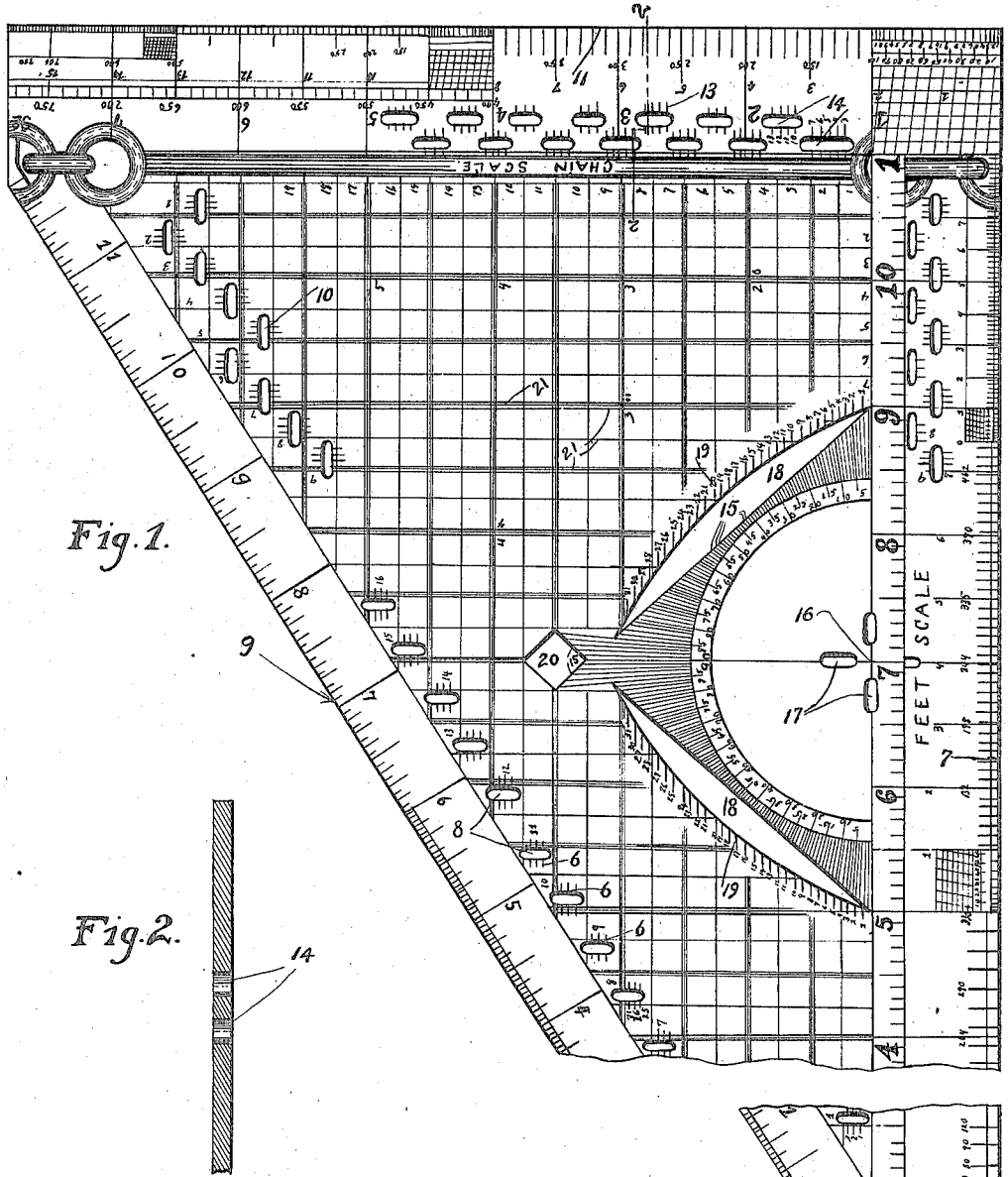

SAMUEL M. KEKUEWA, OF HONOLULU, TERRITORY OF HAWAII.

SCALE-PLATE.

1,295,041.  Specification of Letters Patent.  Patented Feb. 18, 1919.

Application filed June 10, 1918. Serial No. 239,221.

*To all whom it may concern:*

Be it known that I, SAMUEL M. KEKUEWA, a citizen of the United States, residing at Honolulu, in the Territory of Hawaii, have invented certain new and useful Improvements in Scale-Plates; and I do hereby declare the following to be a full, clear, and exact description of the invention, such as will enable others skilled in the art to which it appertains to make and use the same.

The present invention relates to new and useful improvements in scales, more particularly of that type including a plate which may be used as a draftsman's angle and which is provided with a series of graduations for effecting various measurements and indications.

It is primarily the object of this invention to embody a maximum number of measuring and indicating functions in a device of this character.

More particularly, it is an object to provide measuring edges for series of graduations which may be disposed inwardly of the body edges of the device without materially weakening said body of the device.

A further object resides in the provision within the body of an angular scale plate of a protractor arrangement, and in this connection it is a more detailed object to provide for a most ready reading of the protractor graduations.

A still further object is to embody in a device of the present nature, an arrangement for roughly calculating the area of an irregular body over which it is placed.

With the above and other objects and advantages in view, the invention resides more particularly in the novel combination, formation and arrangement of parts hereinafter described and particularly pointed out in the appended claims.

In the accompanying drawings:

Figure 1 is a plan view of the improved scale plate.

Fig. 2 is a detail sectional view on the line 2—2 of Fig. 1.

Referring now more particularly to the accompanying drawings, the present embodiment of my invention comprises a triangular plate, having its edges arranged at angles of sixty, thirty, and forty-five degrees whereby the plate forms in contour an ordinary draftsman's angle, the acute angle portions of the plate being, however truncated on lines parallel to the opposite right angular sides of the plate.

The various external edges of the plate are provided with scale graduations for different purposes, certain of these graduations being of a micrometer type.

To provide marking edges for a series of graduations 6 reading from the side 7 of the body plate which is of intermediate length, a series of slots 8 are provided along the hypotenuse portion 9 of the plate, these slots being elongated on axes perpendicular to the intermediate side 7 and having their adjacent end portions overlapping lines extending parallel to the side 7, whereby a plurality of measuring edges are afforded, and the graduations 6 are distributed along these measuring edges of the slots, in proper progressions. The plate is also provided with a series of slots 10 forming coöperating marking edges for graduations 11 reading from the short side portion 12 of the plate. Along this short side portion 12 of the plate, adjacent its edge there is provided a chain scale 13 which is provided with marking edges formed by the sides of a series of elongated slots 14 extending longitudinally of the short side portion 12 and arranged in staggered pairs.

To provide a protractor, a series of protractor graduations 15 radiate inwardly from a center point 16 disposed adjacent the edge of the side portion 7, and to insure a proper coincidence of this center point 16 with a desired point on the work, pairs of slots 17 are provided on quadrant lines extending from said center point 16. To provide marking edges for the graduation lines 15, the plate is provided with a pair of convergent slots 18 extending from the base line of the protractor scale to points adjacent the apex thereof. The inner sides of these slots are straight and intersect the graduation lines 15 at varying angles, being disposed obliquely with respect to most of the graduation lines whereby to permit a most efficient marking thereof by reason of the increased spaces between the intersections of the lines from the spaces afforded by the usual semicircular marking edges of a protractor scale. The outer sides of the slots 18 are preferably arcuate and form the marking edges for series of graduations 19 reading from side portion 7 of the plate.

To provide marking edges for the graduation lines 15 immediately adjacent the apex of the protractor scale, and disposed between the slots 18, an opening 20 is provided in the plate having annularly disposed edges meeting at the apex of the protractor scale and intersected by the extended central graduation lines 15. By providing this separate opening for the central graduation lines, all of the graduations may be readily marked and the weakness of the plate which would be caused by a continuous extent of the marking edges from one end portion of the protractor scale to the other end portion of the base, is avoided.

The series of slots forming the inner marking edges for the various scales heretofore described also provide efficiently for marking their corresponding scales without the weakening of the plate which would be caused by a continuous extent of the marking edges.

To provide an arrangement for roughly calculating the area of an irregular plane body, the major portion of the plate is divided by cross lines 21 into blocks and upon placing the plate upon an object the number of these blocks falling within the boundary of the object may be counted and inasmuch as the blocks each form a definite unit of measurement, preferably a fraction of a square inch, the area may be readily determined.

What is claimed is:

1. A scale plate having series of graduations on its edges and provided inwardly of its edges with a series of slots and graduations arranged along sides of said slots whereby said sides coact to form marking edge portions for the series of graduations on the plate edges.

2. A scale plate having series of graduations on its edges and provided inwardly of its edges with a series of slots elongated in parallel directions and a series of marking graduations on sides of said slots whereby said sides coact to form marking edge portions for the series of graduations on the plate edges.

In testimony whereof, I affix my signature, in the presence of two witnesses.

SAMUEL M. KEKUEWA.

Witnesses:
C. J. McCarthy,
William K. Poai.